(12) United States Patent
David Buckley et al.

(10) Patent No.: US 7,774,822 B2
(45) Date of Patent: Aug. 10, 2010

(54) AUTONOMOUS POLICY DISCOVERY

(75) Inventors: Martin John David Buckley, Sandy, UT (US); Tambet Ingo, Tartu (EE); Jose H. Mercado, Cambridge, MA (US); Carlos Enrique Montero-Luque, Cambridge, MA (US)

(73) Assignee: Novell, Inc., Provo, UT (US)

( * ) Notice: Subject to any disclaimer, the term of this patent is extended or adjusted under 35 U.S.C. 154(b) by 1007 days.

(21) Appl. No.: 11/196,629

(22) Filed: Aug. 3, 2005

(65) Prior Publication Data
US 2007/0033636 A1     Feb. 8, 2007

(51) Int. Cl.
*G06F 19/00* (2006.01)

(52) U.S. Cl. .......................... 726/1; 707/771; 709/202

(58) Field of Classification Search .................. None
See application file for complete search history.

(56) References Cited

U.S. PATENT DOCUMENTS

| | | | |
|---|---|---|---|
| 5,544,322 A | 8/1996 | Cheng et al. | |
| 5,870,561 A | 2/1999 | Jarvis et al. | |
| 6,230,271 B1 | 5/2001 | Wadlow et al. | |
| 6,393,474 B1 | 5/2002 | Eichert et al. | |
| 6,405,318 B1 * | 6/2002 | Rowland | 726/22 |
| 6,418,466 B1 | 7/2002 | Bertram et al. | |
| 6,578,076 B1 | 6/2003 | Putzolu | |
| 6,678,835 B1 * | 1/2004 | Shah et al. | 714/4 |
| 6,769,118 B2 | 7/2004 | Garrison et al. | |
| 6,990,518 B1 * | 1/2006 | Secer | 709/223 |
| 7,043,660 B1 * | 5/2006 | Bolar | 714/4 |
| 7,069,337 B2 * | 6/2006 | Rawlins et al. | 709/238 |
| 7,174,557 B2 * | 2/2007 | Sanghvi et al. | 719/318 |
| 7,213,068 B1 * | 5/2007 | Kohli et a | 709/225 |
| 7,359,393 B1 * | 4/2008 | Nalawade et al. | 370/401 |
| 7,376,154 B2 * | 5/2008 | Ilnicki et al. | 370/488 |
| 2003/0046583 A1 * | 3/2003 | Goldman et al. | 713/201 |
| 2003/0145041 A1 * | 7/2003 | Dunham et al. | 709/203 |
| 2003/0149695 A1 * | 8/2003 | Delaire et al. | 707/10 |
| 2005/0066197 A1 * | 3/2005 | Hirata et al. | 713/201 |
| 2005/0198647 A1 * | 9/2005 | Hipp et al. | 719/310 |
| 2008/0267144 A1 * | 10/2008 | Jano et al. | 370/338 |

FOREIGN PATENT DOCUMENTS

EP    1143665 A2    10/2001
WO    WO-0129676 A1    4/2001

OTHER PUBLICATIONS

"European Application No. 06118383.6 Office Action dated Feb. 7, 2008",6 pgs.
"Service Location Protocol, Version 2", (Jun. 1999), 23 pgs.
Durham, D., "The COPS (Common Open Policy Service) Protocol", http://www.ieft.org/rfc/rfc2748.txt, Network Working Group, Request for Comments: 2748, (Jan. 2000), 38 Pages.

* cited by examiner

*Primary Examiner*—William R Korzuch
*Assistant Examiner*—Michael R Vaughan
(74) *Attorney, Agent, or Firm*—Schwegman, Lundberg & Woessner, P.A.

(57) ABSTRACT

Techniques for autonomous policy discovery are provided. Machines have personality profiles. The personality profiles permit machines to request advice from different machines having similar personality profiles. This facilitates automatic and autonomous discovery of policies for detected events and facilitates autonomous processing of actions, which are processed in response to the discovered policies. Furthermore, the personality profiles allow administrators to monitor and to dynamically alter policies associated with the machines.

6 Claims, 3 Drawing Sheets

AUTONOMOUS POLICY DISCOVERY

FIELD

The invention relates generally to network administration and more particularly to autonomous policy discovery in networked resources.

BACKGROUND

Network devices or machines are typically configured to process services distributed and managed by an enterprise. However, each machine rapidly acquires its own unique state based in part on actions of its user and based in part on unique processing associated with its installed services. The result is a plurality of individual machines, which a network administrator must attempt to monitor and to manage according to enterprise standards. This can result in too much manual intervention and too much work for a network administrator. In fact, the work load may quickly overwhelm network administration.

Take for instance when an administrator initially installs services or systems on machines of a network; when something changes with respect to those services, not only the policies have to change, but the administrator may also have to audit the changes manually in order to properly set up the services. This example scenario has obvious scalability issues, and is static unless re-provisioning of the services and policies occur. Also, the example scenario does not account for a highly dynamically changing network or machine topology and/or network or machine availability.

As yet another illustration, consider a machine that executes a service, such as a word processor application. If the word processor application fails and abnormally terminates, often the user of the machine will manually notify an administrator or the word processor application sends an automatic message to the administrator. In either case, the resolution for the failure is delayed and must be manually addressed at a later time through manual actions of the user, after the appropriate resolution is received from the administrator. An administrator can quickly become loaded down with repetitive and sometimes simple fixes for the word processor application.

SUMMARY

In various embodiments, autonomous policy discovery techniques are provided for networked machines. More particularly and in an embodiment, an event within a local environment of a first machine is detected. A policy is discovered by requesting advice from a second machine in response to the detected event. One or more actions are processed on the first machine in response to the second machine's advice and the discovered policy.

DETAILED DESCRIPTION

A "service" includes a software application or combinations of applications that act as a system. A resource includes a service and may also include a device or machine (e.g., printer, computer, intelligent apparel, intelligent appliance, phone, laptop, personal digital assistant (PDA) tablet personal computer (PC), network switch, hub, bridge, router, etc.). A resource may also include a user of a device or machine, a directory, or a data store (e.g., database, electronic file, data warehouse, etc.).

An event is a signal or data that can be trapped, raised, and detected for a resource. A policy includes one or more conditional statements that define actions to take or not to take in the event that the conditional statements evaluate to true. Events and policies may be defined using any normalized data format or language, such as, but not limited to, extensible markup language (XML), and others. Events and policies may predefined by developers or network administrators. In some cases, events and policies may be automatically generated by services or other resources.

A "personality profile" refers to a configuration and/or state of a resource, such as a machine. The personality profile may be represented in a normalized data language or format in manners similar to the events and policies. The information that may be included within a personality profile may include, but is not limited to, hardware settings, resource identifiers, calendar day, time of day, resource usage and/or load, directory structure, hardware configurations, resource configurations, hardware profile (e.g., processor speed, size of random access memory (RAM), size of storage devices, etc.), internet cache, cache content, register content, protocol capabilities and/or settings, peripheral device settings, resource licenses, etc. A personality profile of a resource may have portions that remain relatively static and other portions that are in continuous flux based on a given snapshot of a state for the resource.

Various embodiments of this invention can be implemented in existing resource or machine architectures as enhancements via network services. For example, in some embodiments, the techniques presented herein are implemented in whole or in part in the ZENworks® product, distributed by Novell®, Inc., of Provo, Utah. That is, in some embodiments, ZENworks® may be used to deploy novel services to resources within a network that facilitate the autonomous policy discovery and management described herein and below.

Of course, the embodiments of the invention can be implemented in a variety of architectural platforms, operating and server systems, or applications. Any particular architectural layout or implementation presented herein is provided for purposes of illustration and comprehension only and is not intended to limit embodiments of the invention.

Figure 1:
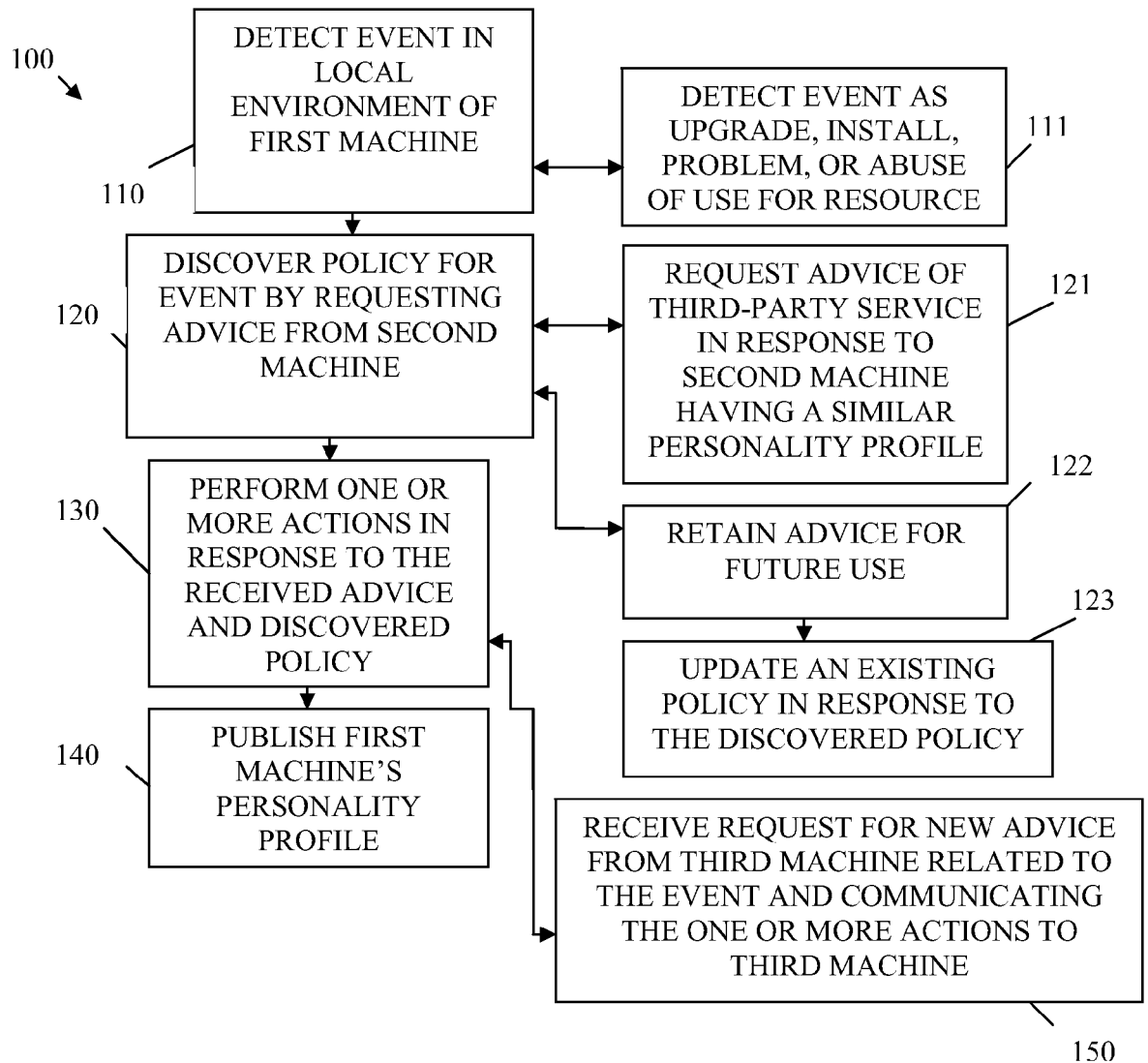
FIG. 1 is a diagram of a method for autonomous policy discovery within a machine, according to an example embodiment.

FIG. 1 is a diagram of a method 100 for autonomous policy discovery within a machine, according to an example embodiment. The method 100 (hereinafter "policy discovery service") is implemented in a machine-access and machine-readable medium and is capable of communicating with other instances of itself over a network which reside on other and different machines or resources. In an embodiment, the policy discovery service is implemented on a machine and permits that machine to autonomously discover policies and to autonomously take actions in response to those discovered policies.

Initially, policy discovery service executes on a first machine and is in communication with a network. The network may be wired, wireless, or a combination of wired and wireless. The policy discovery service idles or listens for defined events on the first machine. At 110, the policy discovery service detects a predefined event within a local environment of the first machine.

In an embodiment, the event may be associated with activity associated with a resource, such as another service or device in communication with the first machine. The event may have been raised based on other policies that process on the first machine or automatically detected by the policy discovery service based on event definitions. For example, an event may be raised when a service executing on the first machine fails or hangs with no response. The policy discovery service is configured to detect such an event when it occurs or is raised within the local environment of the first machine.

In still another embodiment, at 111, the event may be detected as an upgrade, an install, a problem or abuse of use. For example, the event may be sent by a network administrator directly to the first machine to force the policy discovery service to detect a request for an upgrade of a resource or a new install of a resource. In other cases, the event may be a problem with a resource, such as a failure, a performance problem, or associated with activity that may indicate a malicious activity by a particular resource. A resource may also abuse its defined usage, such as when a license is being improperly abused or a resource is hording excessive memory or processing. In fact, a variety of situations that warrant some desired action on the first machine may be defined as events and autonomously detected by the policy discovery service or pushed to the policy discovery service by an administrator or another networked machine. All such situations are intended to fall within the scope of the embodiments presented herein.

At 120, the policy discovery service attempts to match the detected event to an existing policy. If such a policy exists, then there is no need for the policy discovery service to solicit help from other network machines processing on the network that have other instances of the policy discovery service executing. Assuming a policy is not discovered or is discovered but is incomplete, then the policy discovery service requests advice from a second machine over the network to help identify or provide a policy to deal with the detected event.

In an embodiment, at 121, the policy discovery service requests advice by first identifying the second machine as having a same or similar personality profile. A variety of techniques may be used to determine a same or similar personality profile to one that is also associated with the first machine. For example, a signature, a classification, or a scoring technique may be deployed to match the personality profiles and identify the second machine. Alternatively, the policy discovery service may manage a list of similar personality profiles that is periodically updated and the list may be inspected to find the identity of the second machine or to obtain identities of several other machines.

In yet another embodiment, at 121, the policy discovery service may contact a third-party service and may submit its own personality profile as a search query. The third-party service returns one or more matches of machines having similar personality profiles. The policy discovery service then selects the second machine or all the answer set machines and contacts them with the detected event as part of a request to discover a policy to deal with the event.

Once the second machine returns its advice by way of a policy or an identifier for a policy, the policy discovery service may, at 122, elect to retain the policy for future reference and use should the detected event resurface on the first machine a subsequent time. It is noted that in some arrangements the second machine may return as part of its advice a policy identifier, the policy discovery service may use the identifier to query a network policy store and acquire the policy being suggested as advice to the policy discovery service.

In some cases, at 123, the policy discovery service may use the advice to update one or its own existing policies. That is, the policy discovery service may have been in possession of the proper policy to enforce in response to the detected event but may have been unaware of its proper association to the detected event. The association may be supplied by the second machine via the advice and the policy discovery service may use this advice to update that existing policy, such that its association is properly noted with the detected event.

Once the policy discovery service has discovered a new or pre-existing policy to deal with the detected event, at 130, that policy is enforced by performing one or more actions defined in the policy. Actions are autonomous initiated by the policy discovery service on the first machine. That is, the actions are not manually initiated or pushed to the first machine.

In some cases, the actions may be associated with other resources or remote network services that perform some operations in response to the detected event. For example, an action may be used to rate limit bandwidth being allocated to a resource associated with the first machine because the resource may be problematic to the first machine or to the network as a whole but a determination cannot be definitively made at this point in time. Alternatively, an action may be to kill the processing of a resource, uninstall the resource, and reload the resource because of a lost or corrupted file associated with the resource. In fact any automatically processed operation may be an action, where the action is identified within the conditional logic of the discovered policy and associated with the detected event.

In some embodiments, the discovered policy may be discovered or identified based on a weighting scheme. In such embodiments, a specific policy may become more or less likely to be discovered and used by the policy discovery service if other conditions or events are detected within the local environment of the first machine. Thus, the discovery of a policy does not have to be a binary decision based on the detected event; it can depend on other events previously or as yet undetected and/or can depend on information contained in the current personality profile of the first machine or even other conditions within the local environment of the first machine. All these factors contribute to a weighting scheme for the policies and permit the policy discovery service to discover the appropriate policy to enforce.

In an embodiment, at 140, the policy discovery service may also periodically resolve its current personality profile and publish that profile to other network machines or to a central profiling service over the network. This permits other network machines that execute instances of the policy discovery service to request advice from the first machine when they detect events and are unable to resolve a policy to enforce.

For example, at 150, the policy discovery service may subsequently receive a request for new advice from a third network machine where that request also includes the detected event that the policy discovery service previously resolved. In such a situation, the policy discovery service may communicate the new advice back to the third machine as a series of one or more actions that it performed, as a defined policy, and/or as a policy identifier. This permits machines to automatically interact with one another over a network and resolve policies for enforcement autonomously without any network administrator manual interference.

The processing of FIG. 1 demonstrates the method 100, which represents the processing of a policy discovery service.

The policy discovery service autonomously interacts with peer network machines and resolves or newly discovers policies to deal with events detected on a first machine that executes the policy discovery service. Moreover, the policy discovery service may speculate on the appropriate policy to enforce in response to a detected event based on weighting schemes. Actions are autonomously taken in response to enforcing the discovered policies. In this manner, networked machines acquire a degree of independence from network administration and are capable of staying in substantial synch with one another and/or resolving their on problems or issues in an automated and dynamic or real-time manner.

Figure 2:
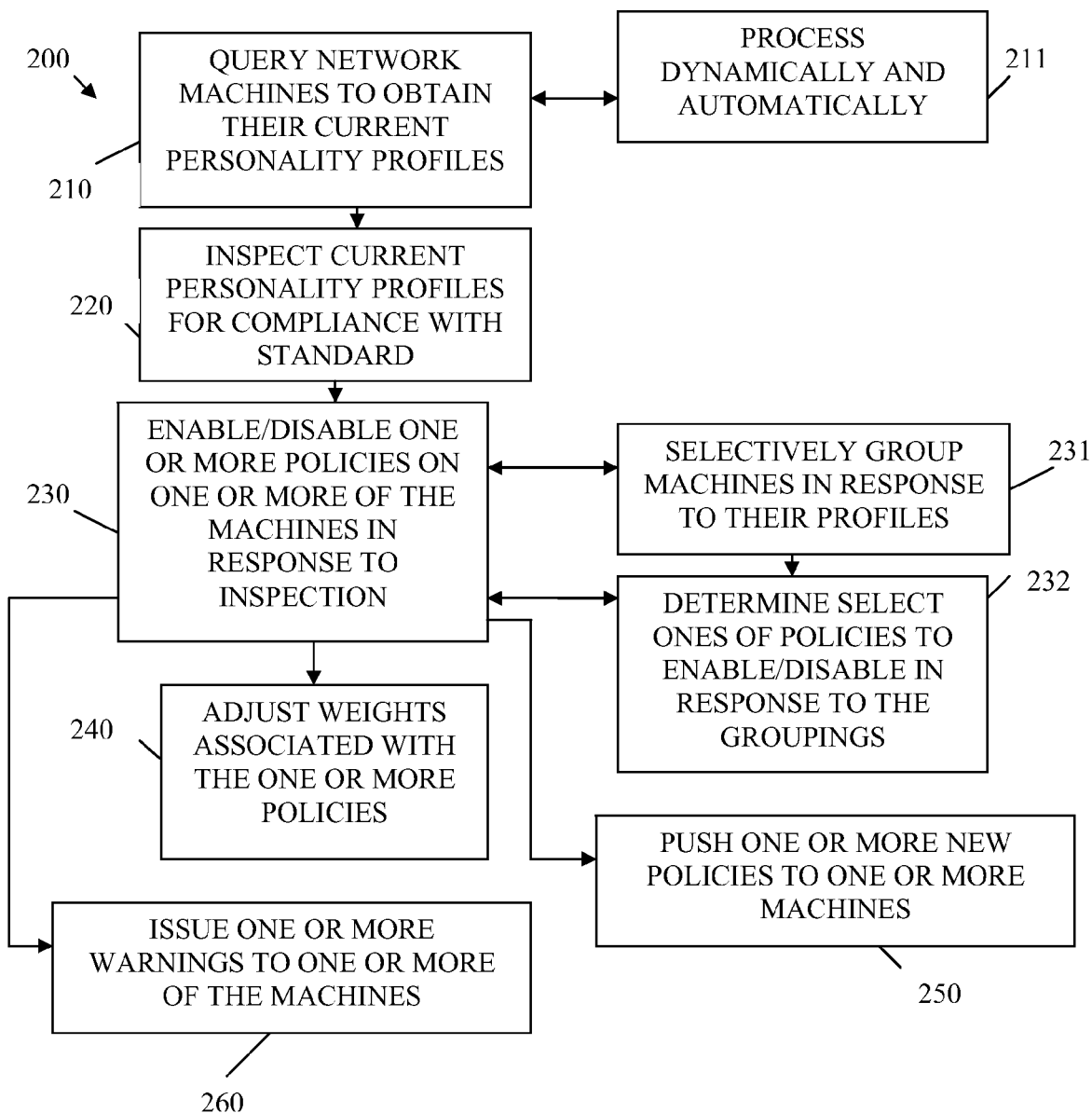
FIG. 2 is a diagram of a method for managing and distributing policies to networked machines, according to an example embodiment.

FIG. 2 is a diagram of a method 200 for managing and distributing policies to networked machines, according to an example embodiment. The method 200 (hereinafter "administrative policy service") is implemented in a machine-access and machine-readable medium. The administrative policy service represents processing of an administrator service and/or interface, which permits administrative actions to occur in a more automated manner on machines of a network that process the method 100 represented by FIG. 1.

Initially, the administrative policy service executes on a network machine and is designed to interact with other network machines that are processing the method 100 of FIG. 1. The administrative policy service permits automated, at 211, or manual enablement or disablement of policies being enforced and communicated on the network amongst the network machines. That is, the administrative policy service acts a global administrator of policies and is capable of turning policies on, turning policies off, installing new policies, adjusting weights for policies, and issuing warnings for each of the networked machines.

At 210, the administrative policy service queries network machines to obtain their current personality profiles. This query may be automatically initiated based on an event, such as a calendar day or time of day, or the query may be manually initiated by an administrator interacting with other interfaces of the administrative policy service. Additionally, the administrative machine that executes the administrative policy service may have its own global policies that dictate when and how a query is initiated to obtain the current personality profiles of the network machines. In some embodiments, the query may actually be issued to a profiling service that gathers and indexes the personality profiles for the network machines. Thus, the administrative policy service may directly query the network machines or indirectly query the network machines via a third-party service.

Once the current personality profiles are obtained for the networked machines, at 220, the administrative policy service inspects the personality profiles for compliance with a standard. The standard may be related to a global policy with respect to a specific resource, a selective group of resources, or the local environments of the networked machines. In some cases, the standard may be related to some network administrative action that an administrator wants to be performed on a certain calendar day or time of day, such as upgrading a specific resource or installing a new resource. In fact, any reason that precipitates a desired network administrative action may be defined as the standard and used to detect compliance from the network machines based on their current personality profiles.

At 230, the administrative policy service may enable and/or disable one or more policies that exist and process autonomously on one or more of the networked machines. Whether a particular policy is enabled or disabled is determined as a result of or in response to the inspection of the current personality profiles to the standard.

For example, the administrative policy service may determine that a particular network machine is abusing its Internet bandwidth and that such an abuse is occurring with a particular resource. The determination of the abuse is made based on a standard defining bandwidth and comparing that bandwidth with a personality profile of network machine. That profile identifies a usage reading for Internet bandwidth of a resource X, which exceeds the allowed bandwidth. In response to this, the administrative policy service may enable a policy processing on the network machine to rate-limit X's Internet usage or to terminate X's Internet usage. A variety of other scenarios and examples may be presented for purposes of disabling or adjusting existing policies on the network machines. All such scenarios are intended to be included with the description presented herein.

In an embodiment, at 231, the administrative policy service may dynamically group selective network machines into categories in response to their received current personality profiles. This permits the administrative policy service to deal with policy enforcement based on selective groupings of machines having similar personality profiles. For example, every machine having a certain version of a word processor may be grouped into a dynamic category that is to receive an upgrade to a newer version of that word processor. In this manner, at 232, the administrative policy service may determine to enable and/or disable policies on select ones of the networked machines in response to assigned groupings or categories for the personality profiles of the machines. Therefore, enablement and/or disablement may be achieved across a select number of the machines, across all the machines, or on a single machine.

According to an embodiment, at 240, the administrative policy service may also adjust the weights or weighting algorithms of the network machines in response to the inspection of the personality profiles vis-à-vis the standard or global policy being processed by the administrative policy service. For example, the administrative policy service may find that weighting schemes for policies on the network machines are resulting in the incorrect enforcement of a policy. In this case, the administrative policy service may want to modify the weighting of a particular policy or of a weighting scheme to ensure that the network machines execute a desired policy and not an incorrect policy.

In an embodiment, at 250, the administrative policy service may also elect to push one or more new policies to one or more of the network machines. That is, the administrative policy service may determine that a new policy is needed for a newly installed or encountered resource. In this situation, one or more new policies may be pushed to the appropriate machines for immediate, dynamic, and autonomous enforcement on those machines.

For example, a new database or directory may be installed on a number of the machines and the administrative policy service may desire to limit the storage that each machine may have within the database or directory by pushing one or more new policies to each of the machines, such that the machines autonomously enforce the one or more new policies on their own independent of the administrative policy service.

In yet another embodiment, at 260, the administrative policy service may also issue one or more warnings to one or more of the network machines. That is, the administrative policy service may want to warn a number of the network machines about certain patterns or readings included in their personality profiles.

For example, a particular resource may be inspecting files or data within a network machine too frequently indicating that potential malicious behavior may be transpiring on the network machine. The warning may be processed automatically on each of the machines to which it is sent or it may be raised as a message to a user of the machines.

The administrative policy service permits an automatic service to assist with network administration of autonomous network machines or resources. This is achieved by the administrative policy service interacting with instances of the method 100 of FIG. 1 to inspect profiles of the machines and to enable and/or disable policies being autonomously enforced on those machines in response to comparing the profiles against a standard. This automates network administration.

It should also be noted that although the administrative policy service is an automated service there may be aspects of the administrative policy service that permit manual interaction by a network administrator, such that standards may be created and policies may be selectively and manually enabled and/or disabled. So, a manual interface may permit a network administrator to interact with the information collected by the administrative policy service, namely the personality profiles, such that the information may be manually analyzed and new standards manually defined within the administrative policy service.

Figure 3:
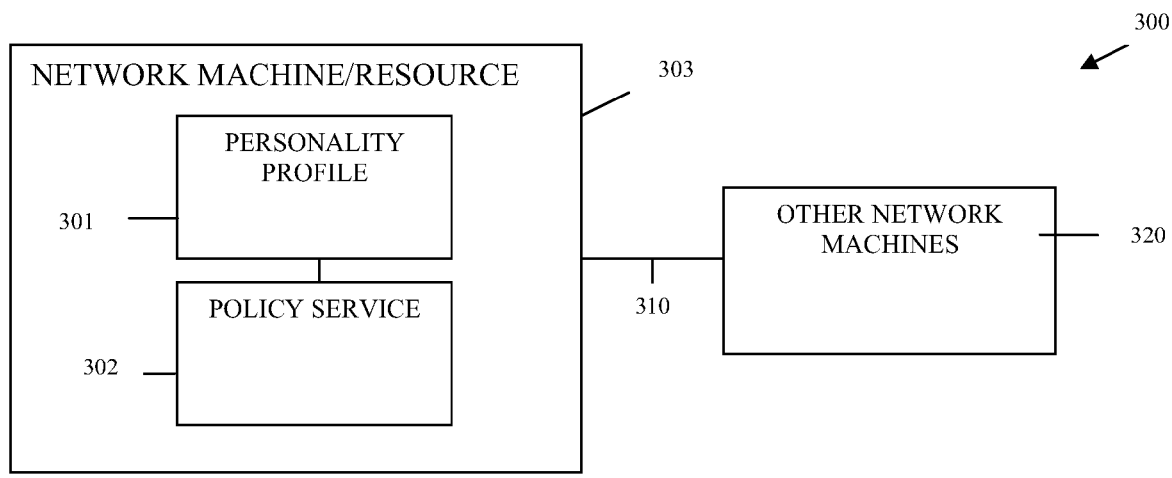
FIG. 3 is a diagram of an autonomous policy discovery system, according to an example embodiment.

FIG. 3 is a diagram of an autonomous policy discovery system 300, according to an example embodiment. The autonomous policy discovery system 300 is implemented in a machine-accessible and computer-readable medium and is operational over a network. The network may be wired, wireless, or a combination of wired and wireless.

In an embodiment, the autonomous policy discovery system 300 implements, among other things, the method 100 of FIG. 1. Accordingly, each machine or resource on a network may process or implement the autonomous policy discovery system 300, such that each of the duplicative instances of the autonomous policy discovery system 300 communicate with one another to perform autonomous policy discovery and policy enforcement on each of their respective machines.

The autonomous policy discovery system 300 includes a personality profile 301 and a policy service 302. The personality profile 301 and the policy service 302 reside within the local environment of a network/machine or resource 303 and communicate over a network 310 to other instances of the autonomous policy discovery system 300, which resides and executes within the local environments of other network machines or resources 320.

The personality profile 301 includes resource state information, resource settings, resource configurations, and resource usage information for the resources associated with the network machine 303. Portions of the personality profile 301 may be static and other portions may be a determined in real time or dynamically determined. The personality profile 301 may be captured in a normalized data format or data language, such as XML. The personality profile 301 may be captured and assembled by a profiling service executing on the network machine 303 or may be captured and assembled by the policy service 302.

The personality profile 301 is designed to provide a current view of the environment of the network machine 303. One instance of a personality profile 301 may be compared with other instances of the personality profile 301 associated with the other network machines 320. The comparisons may be based on specific desired information related to a specific resource or the comparisons may be more generic based on the overall environment of the machines 303 and 320.

The policy service 302 acquires or generates the personality profile 301. The policy service 302 also detects events on the machine 303 for purposes of discovering existing policies to apply on the machine 303 or for purposes of discovering and acquiring new policies from the other machines 320, which can then be enforced or applied on the machine 303.

During operation of the autonomous policy discovery system 300, the policy service 302 monitors the machine 303 for events. The events are then attempted to be matched to policies known to the policy service 302. In some embodiments, this may result in the policy service 302 querying an external or local policy store with an identifier associated with the detected events. In still other embodiments, the policy service 302 may self-manage its own list of policies, which are locally stored and available to the policy service 302.

If the policy service 302 is unable to associate a specific policy with the detected event, then the policy service 302 attempts to enlist the help of one or more of the other network machines 320. One technique for doing this is for the policy service 302 to broadcast the detect event or information about the detected event over the network 310 to each of the other network machines 320 along with the current personality profile 301 of the network machine 303. Another technique is to pre-identify select ones of the other network machines 320 that are determined to have similar personality profiles as the personality profile 301 of the network machine 303. In still another technique, the policy service 302 may select a specific one of the other network machines 320 based on that machine's personality profile 301.

The policy service 302 may maintain a list of personality profiles 301 for the other network machines 320 or may query a profiling service (externally or locally) with its own personality profile 301 for the network machine 303 using its personality profile 301 as a search term. The policy service 302 uses its personality profile 301 to solicit advice from all, select groupings, or a particular one of the other network machines 320, which may have experience in dealing with the detected event.

In response to the solicitation, one or more of the other network machines 320, having experience with the detected event and having a similar personality profile 301 to that of the network machine 303, responds with advice to the policy service 302. The advice may include a fix or an update to an existing policy of the policy service 302, may include a newly identified policy to handle the event, or may include a new weight to assign an existing policy for the event. The advice permits the policy service 302 to assign or discover a policy for purposes of handling the detected event. Furthermore, in some instances, the advice may be a policy identifier that is used by the policy service 302 to acquire a policy from a policy store.

The policy service 302 then enforces the discovered policy on the network machine 303. This permits the network machine 303 to self manage itself and to autonomously discover and enforce discovered policies in an automated fashion without requiring manual intervention from a user or an administrator. This alleviates network administration and allows machines 303 and 320 to communicate with one another and remain in close or configured synchronization with one another.

In some embodiments, the policy service 302 may also deploy a weighting scheme to each of its managed policies. Thus, when a detected event is identified other information or conditions within the local environment of the network machine 303 or within the personality profile 301 may be used to assign a weight to a specific policy. Threshold values can assist in determining when a specific policy is chosen to the exclusion of other available policies. In this manner, the policy service 301 does not have to select a policy in a binary fashion; rather, policy selection may occur based on a deployed weighting scheme. Moreover, advice received from other network machines 320 may be used autonomously by the policy service 302 to self adjust or update its deployed weighting scheme within the network machine 303.

Figure 4:
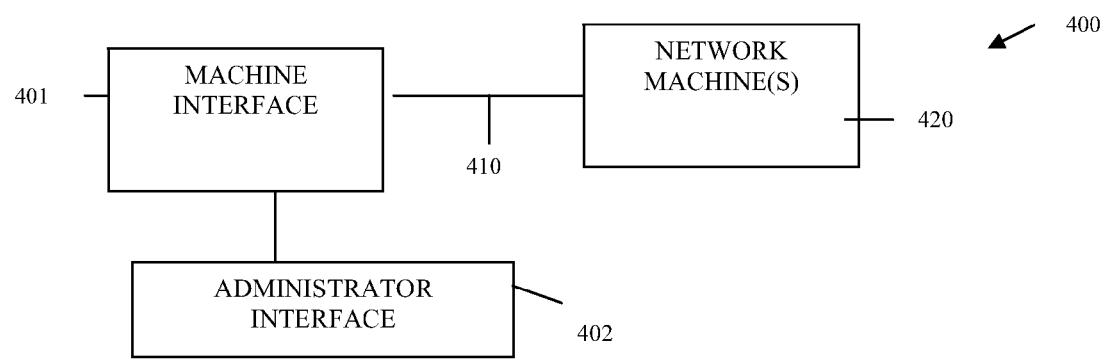
FIG. 4 is a diagram of an administrator policy management system, according to an example embodiment.

FIG. 4 is a diagram of an administrator policy management system 400, according to an example embodiment. The administrator policy management system 400 is implemented in a machine-accessible and computer-readable medium and is accessible over a network. In an embodiment, the administrator policy management system 400 implements, among other things, the method 200 of FIG. 2.

The administrator policy management system 400 interacts with instances of the autonomous policy discover system 300 of FIG. 3 and with instances of the method 100 of FIG. 1. The autonomous policy discovery system 300 and the method 100 execute on networked machines. The machine that implements the administrator policy management system 400 may be on the same machine as one that implements the autonomous policy discovery system 300 or the method 100 or may be on a machine that does not implement the autonomous policy discover system 300 or the method 100.

The administrator policy management system 400 includes a machine or resource interface 401 and an administrator interface 402. The machine interface 401 communicates over a network 410 with instances of the autonomous policy discovery system 300 or the method 100 residing on network machines or resources 420 for purposes of globally monitoring and enforcing policies that are autonomously managed and enforced on the network machines 420.

The machine interface 401 is designed to interact over the network 410 with instances of the method 100 or the autonomous policy discovery system 300 that is implemented and executing on the network machines 420. The machine interface 401 also interacts with the administrator interface 402 for purposes of receiving instructions to communicate to the network machines 420.

One interaction of the machine interface 401 with the network machines 420 is performed to acquire current personality profiles of the network machines 420. The personality profiles are then communicated from the machine interface 401 to the administrator interface 402. The administrator interface 402 interacts with a standards service to ensure that the received personality profiles comply with a given standard. If some profiles do not comply with the standard being evaluated, then the administrator interface 402 is equipped to communicate through the machine interface 401 to install, adjust, enable, and/or disable policies on each of the non complying machines 420.

In some cases, the administrator interface 402 may also adjust weights for existing policies residing on the network machines 420 or adjust or install new weighing schemes being processed on the network machines 420.

The standards service may be part of the administrator service 402, may be local to a machine processing the administrator service 402, or may be external to the machine that processes the administrator service 402. A standard may be viewed as a global administrative policy. The standard may be pre-existing or dynamically created in response to other policies. Furthermore, the standard may be manually supplied via an administrator through the administrator interface 402. Thus, the administrator interface 402 may include other interfaces that permit manual operations or directives received from an administrator. In this manner, the administrative interface 402 may be wholly automated or partially automated, such that manual intervention, inspection, analysis, and/or directives received from administrators may be received and processed.

In an embodiment, the one or more policies that are installed or adjusted on the network machines 420 by the administrator interface 402 via the machine interface 401 are related to the usage of a particular resource on those network machines 420. The resource may be another service or may be a device. It is understood, that the policies may related to a wide variety of administrative controls desired within the network 410, such as, but not limited to, licensing, storage, processing, identity, security, access, and the like.

FIG. 4 is presented for purposes of illustration, other arrangements or architectures are possible. For example, the machine interface 401 and the administrator interface 402 may be combined into a single interface. Alternatively, other smaller interfaces may comprise the functionality of both the machine interface 401 and the administrator interface 402. All such arrangements and components are intended to fall within the generous scope of this disclosure.

It is now understood how machines may autonomously discover and enforce policies on a network by soliciting advice from peers. Moreover, the policies may be altered globally via administrative controls and monitors. These techniques permit more automated network administration having improved controls and monitoring capabilities.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method residing in a computer-readable medium and executed by a first machine for performing the method, comprising:

detecting an event in a local environment of the first machine and determining that the event is not matched in an existing policy of the first machine;

discovering a policy that handles the event, the policy is discovered by requesting advice of a second machine in response to the event, the second machine is determined on behalf of the first machine by a third-party service that performs a query using a personality profile of the first machine and the event, and the third-party service finds a match in performance of that query with the second machine that indicates the second machine has a same personality profile to the personality profile of the first machine and has a policy that handles the event, and the same similar personality profile consists of hardware settings, resource identifiers, hardware configurations, resource configurations, protocol capabilities, peripheral device settings, and resource licenses of the second machine that matches the personality profile of the first machine and the personality profile of the first machine consists of hardware settings, resource identifiers, hardware configurations, resource configurations, protocol capabilities, peripheral device settings, and resource licenses of the first machine, and the policy includes one or more conditional statements that define one or more actions to take when the one or more conditional statements evaluate to true; and performing the one or more actions on the first machine in response to received advice from the second machine and in response to the one or more conditional statements evaluating to true.

2. The method of claim 1 further comprising, publishing the personality profile of the first machine.

3. The method of claim 1 further comprising, retaining the advice received from the second machine within the local environment of the first machine for future reuse if the event is re-detected on the first machine.

4. The method of claim 3, wherein retaining the advice further includes updating an existing policy to reflect the processing of the one or more actions on the first machine if the event is re-detected.

5. The method of claim 1 further comprising, subsequently receiving another event within the local environment of the first machine and received from a third machine as part of a new request for new advice from the third machine and communicating the action to the third machine for purposes of allowing the third machine to process the one or more actions.

6. The method of claim 1, wherein detecting the event further includes detecting the event as at least one of a request to upgrade a resource that is received from an administrator, an autonomously detected problem on the first machine associated with the resource, a request to install the resource that is received from the administrator, and an autonomously detected abuse of usage of the resource on the first machine.

* * * * *

UNITED STATES PATENT AND TRADEMARK OFFICE
CERTIFICATE OF CORRECTION

| | | |
|---|---|---|
| PATENT NO. | : 7,774,822 B2 | Page 1 of 1 |
| APPLICATION NO. | : 11/196629 | |
| DATED | : August 10, 2010 | |
| INVENTOR(S) | : Martin J. Buckley et al. | |

It is certified that error appears in the above-identified patent and that said Letters Patent is hereby corrected as shown below:

On the Title page, Item (56), under "U.S. Patent Documents", in column 2, line 2, delete "a" and insert -- al --, therefor.

In column 10, line 63, in Claim 1, after "same" delete "similar".

Signed and Sealed this

Nineteenth Day of October, 2010

David J. Kappos
*Director of the United States Patent and Trademark Office*